INVENTORS
NEIL C. SHER
JOHN M. ZABSKY
BY Ronald T. Reiling
ATTORNEY

United States Patent Office 3,474,814
Patented Oct. 28, 1969

3,474,814
CONTROL APPARATUS
Neil C. Sher, St. Paul, and John M. Zabsky, Minneapolis, Minn., assignors to Honeywell Inc., Minneapolis, Minn., a corporation of Delaware
Filed Mar. 18, 1968, Ser. No. 713,592
Int. Cl. F15c *1/14, 3/00*
U.S. Cl. 137—81.5
10 Claims

ABSTRACT OF THE DISCLOSURE

A process control system comprising a sensing circuit, a timing circuit, a switching circuit and a control circuit for controlling a continuous cyclic process. The sensing circuit supplies signals indicative of a plurality of process parameters to the timing, switching and control circuits. The timing circuit produces delayed output signals in response to signals from the sensing circuit. The output signals from the timing circuit are routed through the switching circuit to the control circuit.

BACKGROUND OF THE INVENTION

This invention pertains generally to automatic control apparatus and more particularly to apparatus for automatically controlling a continuous cyclic process.

Modern manufacturing methods frequently require that a particular sequence of acts be repeatedly performed on a work product by process equipment. In some instances one complete sequence may require a substantial amount of time. Further, it may be necessary to repeat the sequence a substantial number of times. In the past such processes have frequently required the continuous attention of a human operator who performed the necessary supervisory and control functions. In cases in which the prior art automatic supervisory and control apparatus has been provided, the systems have included electrical, mechanical, hydraulic and/or pneumatic circuits or combinations thereof. Such systems are typically complex, expensive and unreliable. These systems are particular unacceptable in cases in which the nature of the process does not merit the use of an elaborate and expensive automatic control system.

SUMMARY OF THE INVENTION

The applicants' invention comprises a control system for automatically controlling a continuous cyclic process in which a sequence of process steps is continuously repeated. The invention includes a sensing circuit, a timing circuit, a switching circuit and a control circuit. The sensing circuit senses a plurality of process parameters and provides an output signal indicative of each of these parameters. At least one of these signals acts substantially instantaneously on the control circuit. Further, at least one of the signals is also supplied to the switching circuit where it causes the circuit to assume one of a plurality of switched states. In addition, the signal which causes switching of the switching circuit is also supplied to the timing circuit wherein it is delayed for a predetermined length of time and then routed through the switching circuit in accordance with the switched state that has been assumed thereby. The signal from the switching circuit is supplied to the control circuit which is caused to perform one of a plurality of functions in accordance with a particular combination of signals supplied thereto. Means may also be provided for manually operating the control circuit. Further, indicators may be provided for indicating the parameters being sensed and the operating state of the control circuit.

In accordance with the teachings of this invention, automatic control of a continuous cyclic process is accomplished with a minimum amount of hardware. In addition, only standard general purpose elements are used in the system, thus reducing its cost and complexity.

DESCRIPTION OF THE PREFERRED EMBODIMENT

Figure 1:
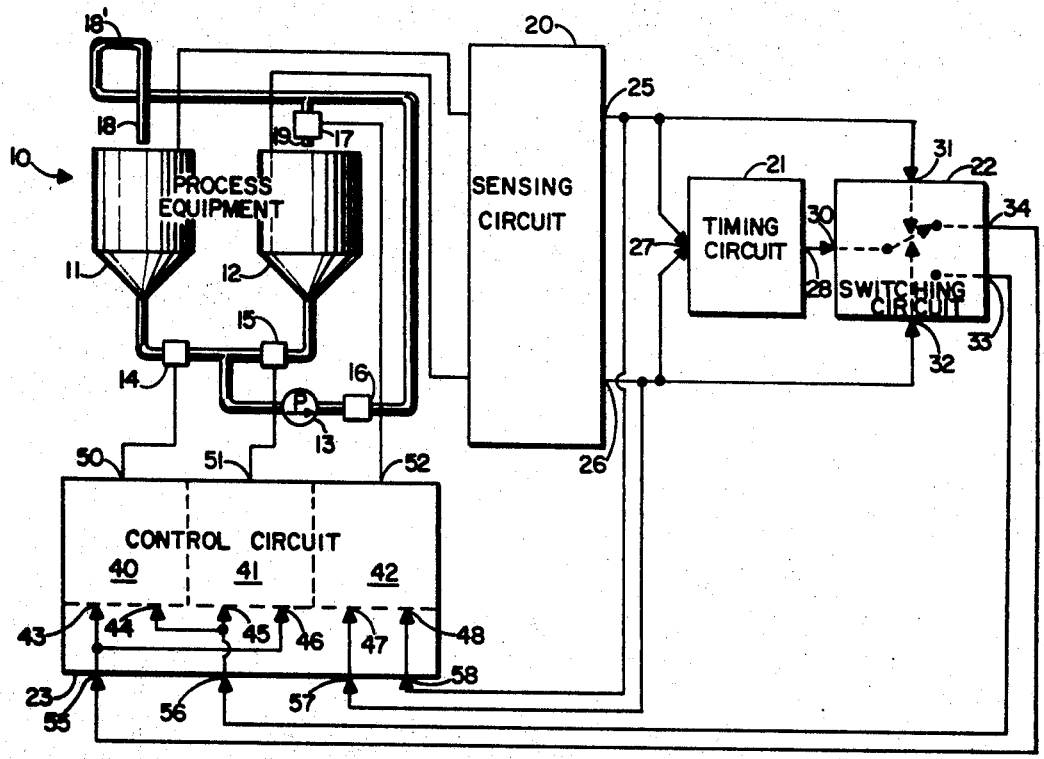
FIGURE 1 is a functional block diagram of the applicants' control system applied to a chemical mixing process.

The applicants' control system as described herein is applied to equipment for performing a chemical mixing process. More particularly, the applicants' system controls this equipment through an automatically repeated sequence of process steps. The equipment being controlled and the applicants' control system can be understood by reference to the block diagram of FIGURE 1 in which reference numeral 10 generally refers to equipment for performing a chemical mixing process comprising a first tank 11 and a second tank 12 for holding liquid chemicals. Tank 11 is provided with a discharge opening which is connected to the inlet of a pump 13 through a valve 14. Tank 12 is provided with a discharge opening which is connected to the inlet of pump 13 through a valve 15. The outlet of the pump is connected to the inlet of a homogenizer 16. The outlet of homogenizer 16 is connected to inlets 18 and 19 to tanks 11 and 12. Inlet 19 to tank 12 includes a valve 17. When valve 17 is open, a relatively low pressure head is required to pump the liquid chemical into tank 12. Inlet 18 to tank 11 contains a piping arrangement 18' such that a higher pressure head is required to pump the liquid chemical into tank 11 than into tank 12. Thus, if valve 17 is open, the liquid will be pumped through inlet 19 into tank 12. If valve 17 is closed, the liquid will be pumped through inlet 18 into tank 11.

The process to be controlled includes the following sequence of process steps: (1) pumping the liquid chemical from tank 11 into tank 12 until the liquid level in tank 11 is reduced to a predetermined point, (2) circulating the liquid remaining in tank 11 through homogenizer 16 and tank 11 for a predetermined length of time, (3) pumping the liquid from tank 12 into tank 11 until the liquid level in tank 12 is reduced to a predetermined point, and (4) circulating the liquid remaining in tank 12 through homogenizer 16 and tank 12 for a predetermined length of time. This sequence of process steps is to be automatically continuously repeated until manually terminated.

The applicants' control system, by which this sequence of steps is accomplished, comprises a sensing circuit 20, a timing circuit 21, a switching circuit 22, and a control circuit 23. Sensing circuit 20 senses the liquid levels in tanks 11 and 12 and provides an output signal if the liquid level in either tank 11 or tank 12 falls below a predetermined point. If the liquid level in tank 11 falls below the predetermined point, sensing circuit 20 provides a signal from a first output 25. If the liquid level in tank 12 falls below the predetermined point, sensing circuit 20 provides a signal from a second output 26. The output signals from sensing circuit 20 are simultaneously supplied to timing circuit 21, switching circuit 22 and control circuit 23.

Timing circuit 21 includes an input 27 and an output 28. Timing circuit 21 functions to provide a signal at output 28 in response to a signal received at input 27. However, a signal provided at output 28 occurs a predetermined length of time after the receipt of a signal at input 27. Input 27 is connected to both outputs 25 and 26 of sensing circuit 20. Thus, a signal produced at output 25 or 26 of sensing circuit 20, will cause a corresponding signal to be provided at output 28 of timing circuit 21. However, the signal provided at output 28 will be delayed a predetermined amount of time from the output signal produced by sensing circuit 20.

Switching circuit 22 includes an input 30, a first switching signal receiver 31, a second switching signal receiver 32, a first output 33 and a second output 34. Switching circuit 22 functions such that a signal at switching signal receiver 31 causes input 30 to be connected to output 33. Conversely, a signal at switching signal receiver 32 causes input 30 to be connected to output 34. Switching signal receivers 31 and 32 of switching circuit 22 are connected to outputs 25 and 26 respectively of sensing circuit 20. Thus, a signal produced at output 25 of sensing circuit 20 causes input 30 of switching circuit 22 to be connected to output 33. Similarly, a signal produced at output 26 of sensing circuit 20 causes input 30 of switching circuit 22 to be connected to output 34.

Input 30 of switching circuit 22 is connected to output 28 of timing circuit 21, thus an input signal to timing circuit 21 results in a delayed signal from either output 33 or output 34 of switching circuit 22. Accordingly, a signal produced at output 25 of sensing circuit 20 will cause a signal delayed in time therefrom at output 33 of switching circuit 22. In a similar manner, signal produced at output 26 of sensing circuit 20 will cause a signal delayed in time therefrom at output 34 of switching circuit 22. Output signals from switching circuit 22 are supplied to control circuit 23 as will hereinafter be described.

Control circuit 23 controls the progress of process equipment 10. More specifically, in this particular embodiment, valves 14, 15 and 17 are opened or closed by control circuit 23. Control circuit 23 is shown as comprising a first subcircuit 40 which controls valve 14, a second subcircuit 41 which controls valve 15 and a third subcircuit 42 which controls valve 17. Each subcircuit includes two inputs. The first and second inputs to subcircuit 40 are identified by reference numerals 43 and 44. The first and second inputs to subcircuit 41 are identified by reference numerals 45 and 46. The first and second inputs to subcircuit 42 are identified by reference numerals 47 and 48. Subcircuits 40, 41 and 42 have outputs 50, 51 and 52 which are respectively connected to valves 14, 15 and 17. Valves 14, 15 and 17 are all normally open valves. Thus, each of the valves remains open if no signal is supplied thereto. However, if a pressure signal is supplied to any one of valves 14, 15 and 17, it will close. Subcircuits 40, 41 and 42 each function such that a signal provided to the second input thereof initiates a signal at the output thereof and a signal supplied to the first input thereof terminates the signal at the output thereof. Thus, a signal supplied to the first input of subcircuit 40, 41 or 42 causes the valve associated with that subcircuit to open. Conversely, a signal supplied to the second input of subcircuit 40, 41 or 42 causes the valve associated with that subcircuit to close.

It should be noted that inputs 43 and 46 of subcircuits 40 and 41 are interconnected. Also inputs 44 and 45 of subcircuits 40 and 41 are interconnected. Thus, if a signal is supplied to input 43 of subcircuit 40, a signal is also supplied to input 46 of subcircuit 41. Similarly, if a signal is supplied to input 44 of subcircuit 40, a signal is also supplied to input 45 of subcircuit 41. Accordingly, control circuit 23 effectively has four inputs. These are designated as inputs 55, 56, 57 and 58. Input 55 communicates with inputs 43 and 46 of subcircuits 40 and 41, input 56 communicates with inputs 44 and 45 of subcircuits 40 and 41, input 57 communicates with input 47 of control circuit 42 and input 58 communicates with input 48 of subcircuit 42. Inputs 55 and 56 of control circuit 23 are connected to outputs 34 and 33 of switching circuit 22. Inputs 57 and 58 of control circuit 23 are connected to outputs 26 and 25 of sensing circuit 20.

Pump 13 and homogenizer 16 operate continuously in normal operation of process equipment 10. For the purpose of this discussion, it will be assumed that tanks 11 and 12 are presently partially filled with liquid and that valves 14 and 17 are open and valve 15 is closed, thus causing liquid to be pumped from tank 11 into tank 12. The liquid in both tanks is above the critical level, therefore no signal is being produced in either output 25 or output 26 of sensing circuit 20. Accordingly, liquid continues to be transferred from tank 11 into tank 12. However, a low liquid level is eventually reached in tank 11, thus causing a signal at output 25 of sensing circuit 20. This signal is immediately conveyed to input 48 of subcircuit 42 which closes valve 17. Closing valve 17 causes the liquid remaining in tank 11 to be continuously circulated through homogenizer 16, inlet 18 and tank 11.

The signal produced at output 25 of sensing circuit 20 is also conveyed to receiver 31 of switching circuit 22 where it causes input 30 to be connected to output 33. In addition, the signal produced at output 25 of sensing circuit 20 is conveyed to input 27 of timing circuit 21. After a predetermined length of time has elapsed, timing circuit 21 produces a signal at output 28 which is conveyed through switching circuit 22 to input 56 of control circuit 23. When the signal from output 33 of switching circuit 22 arrives at input 56 of control circuit 23, subcircuits 40 and 41 open valve 15 and close valve 14. This stops the circulation of the liquid in tank 11 and causes the liquid in tank 12 to be pumped through homogenizer 16 and inlet 18 into tank 11.

Eventually a low liquid level is reached in tank 12, thus causing a signal to be produced at output 26 of sensing circuit 20. This signal is immediately conveyed to input 57 of control circuit 23 which opens valve 17 and causes the liquid remaining in tank 12 to be continuously circulated through homogenizer 16, valve 17, inlet 19 and tank 12. The signal produced at output 26 of sensing circuit 20 is also conveyed to receiver 32 of switching circuit 22 where it causes input 30 to be connected to output 34. In addition, the signal produced at output 26 of sensing circuit 20 is also conveyed to input 27 of timing circuit 21. After the predetermined length of time has elapsed, timing circuit 21 produces a signal at output 28 which is conveyed through switching circuit 22 to input 55 of control circuit 23. When the signal from output 34 of switching circuit 22 arrives at input 55 of control circuit 23, subcircuits 40 and 41 open 14 and close valve 15. This stops the circulation of the liquid in tank 12 and causes the liquid in tank 11 to be pumped through homogenizer 16, valve 17, and inlet 19 into tank 12. This is the same condition that was initially described for process equipment 10 in the discussion of its operation. The above sequence of steps is automatically continuously repeated until manually terminated at which time the liquid is removed from the tanks by external means (not shown).

Figure 2A:
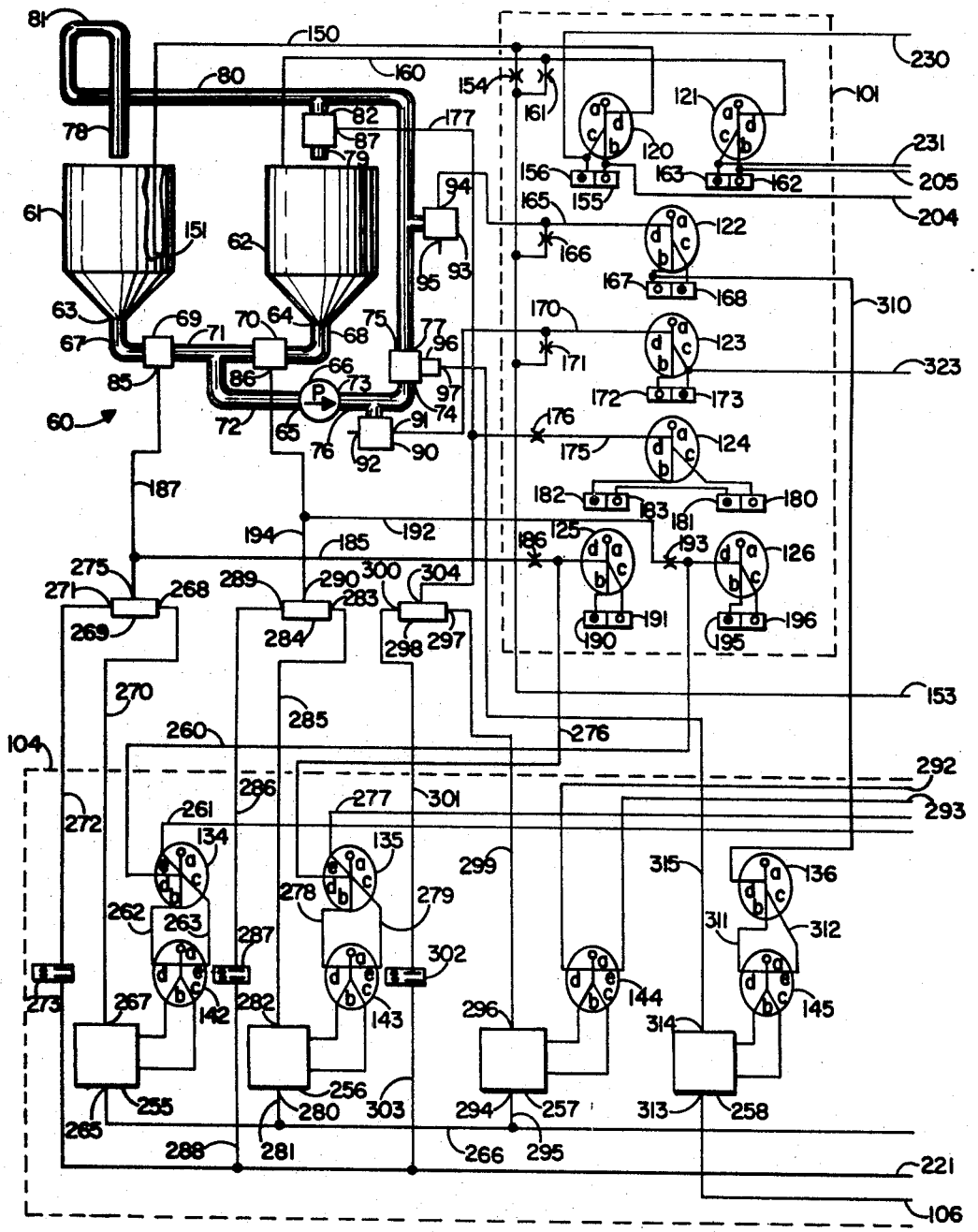
FIGURES 2A and 2B are a schematic diagram of a fluidic implementation of the system of FIGURE 1 in accordance with the teachings of the applicants' invention.
Figure 2B:
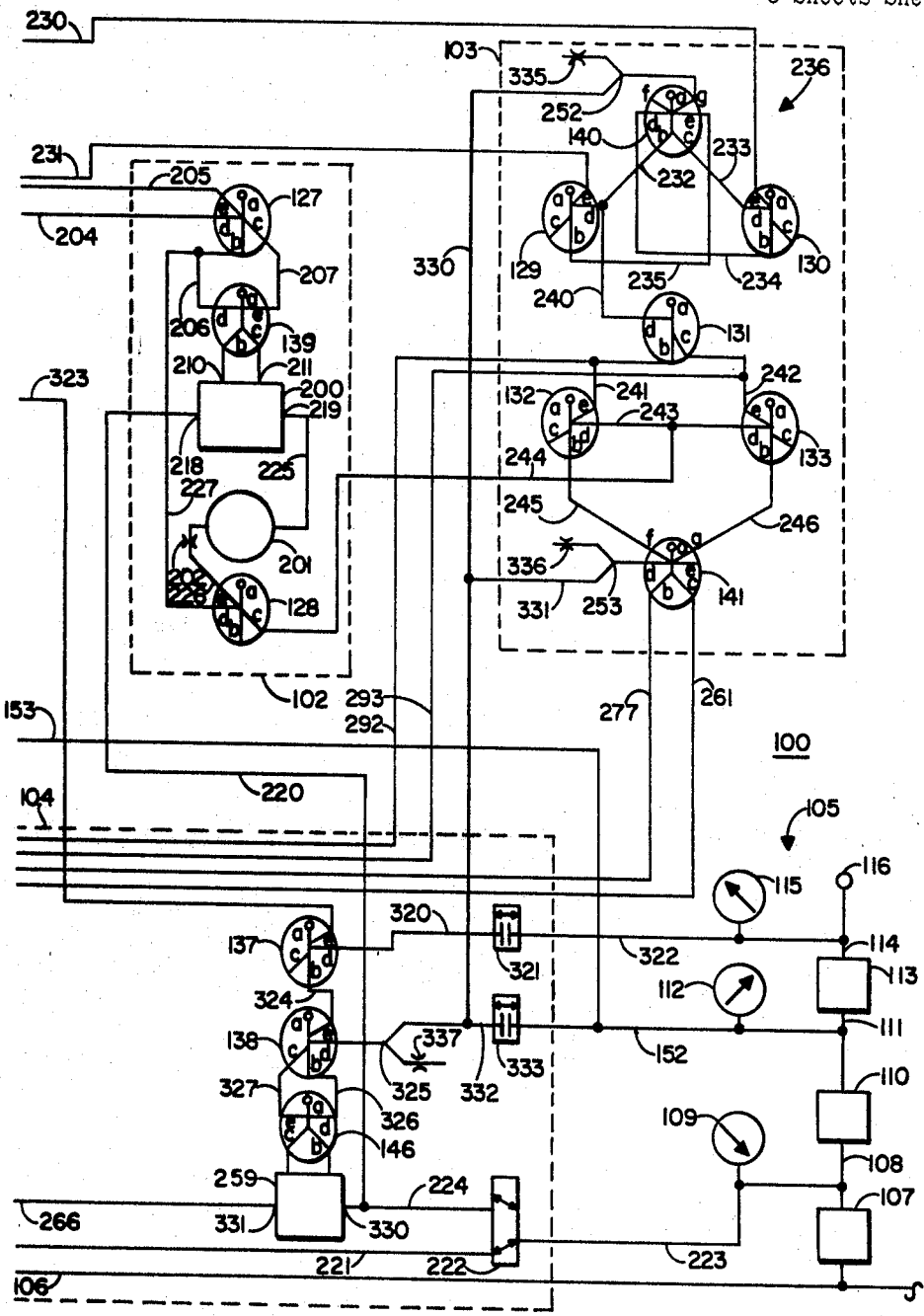

Reference is now made to FIGURES 2A and 2B in which a fluidic control system in accordance with the teachings of the applicants' invention is shown. The system will be discussed using air as the operating medium. It should, however, be understood that the system will operate equally as well on other fluids.

Reference numeral 60 refers to chemical processing equipment comprising a first tank 61 and a second tank 62 for holding liquid chemicals. Tanks 61 and 62 have discharge openings 63 and 64 which are both connected to inlet 65 of a pump 66 through pipes 67 and 68, normally open valves 69 and 70 and pipes 71 and 72. Pump 66 includes an outlet 73 which is connected to input 74 of a homogenizer 75 by means of a pipe 76. Homogenizer 75 includes an outlet 77 which is connected to inlets 78 and 79 to tanks 61 and 62 respectively by means of a pipe 80. Inlet 78 to tank 61 includes a pipe configuration 81 which rises to a higher elevation than inlet 79 to tank 62. Thus, a greater pressure head is required to pump a liquid into tank 61 than into tank 62. Inlet 79 to tank 62 includes a normally open valve 82.

Valves 69, 70 and 82 are pneumatically operated valves, each having a control inlet. Control inlets 85, 86 and 87 are associated with valves 69, 70 and 82 respectively. In the absence of a pneumatic pressure applied to control inlets 85, 86 and 87, valves 69, 70 and 82 will remain open. However, if pneumatic pressure is supplied to control inlet 85, 86 or 87, the valve associated with that control inlet will close.

A pressure sensor 90 is provided in pipe 76 on the discharge side of pump 66. Pressure sensor 90 comprises a normally open valve having an inlet 91 and an outlet 92, and is actuated by the pressure in pipe 76. When the pressure in pipe 76 increases to a predetermined level, the valve in pressure sensor 90 will close. Conversely, if the pressure in pipe 76 falls below the predetermined level, the valve in pressure sensor 90 will open. Inlet 91 is connected to the applicants' control system as will hereinafter be discussed. Outlet 92 is vented to the atmosphere.

A temperature sensor 93 is provided in pipe 80 on the discharge side of homogenizer 75. Temperature sensor 93 comprises a normally closed valve having an inlet 94 and an outlet 95, and is actuated by a temperature sensitive element in thermal communication with the liquid in pipe 80. If the temperature of the liquid in pipe 80 is below a predetermined level, the valve in temperature sensor 93 remains closed. However, if the temperature of the liquid in pipe 80 rises above the predetermined level, the valve in temperature sensor 93 is caused to open. Inlet 94 is connected to the applicants' control system as will hereinafter be discussed. Outlet 95 is vented to the atmosphere.

Secondary control of homogenizer 75 is provided by a control unit 96. Control unit 96 includes an inlet 97 which is normally supplied with air at a pressure of 60 pounds per square inch. If the air supply is cut off, control unit 96 will not permit operation of homogenizer 75.

Reference numeral 100 generally refers to a fluidic control system for process equipment 60. Control system 100 comprises a sensing circuit 101, a timing circuit 102, a switching circuit 103 and a control circuit 104. In addition, a pneumatic supply manifold 105 is provided for supplying air at various pressures to process equipment 60 and control system 100. Manifold 105 includes a high pressure conduit 106 which is supplied with filtered air from a source (not shown) at 60 p.s.i.g. Conduit 106 transmits air to a first regulator 107 which supplies air to a conduit 108 at a pressure of 20 p.s.i. as indicated by gage 109. Conduit 108 supplies air to a second regulator 110. Regulator 110 supplies air to a conduit 111 at a pressure of 10 p.s.i. as indicated by gage 112. Conduit 111 supplies air to a third regulator 113 which supplies air to conduit 114 at a pressure of 1.5 p.s.i. as indicated by gage 115.

Control system 100 includes 27 fluid amplifiers which are indicated in FIGURE 2 by reference numerals 120 through 146. Amplifiers 120 through 138 are monostable. Each of these amplifiers has a power nozzle indicated by the reference character a, a preferred outlet passage indicated by a reference character b, a second outlet passage indicated by a reference character c and a first control port indicated by reference character d for causing a stream issuing from the power nozzle a to emerge through outlet passage c. Certain of the amplifiers, such as amplifier 27, have an additional control port indicated by a reference character e. A signal at control port e also functions to cause a stream from power nozzle a to emerge through outlet passage c.

Amplifiers 139 through 146 are bistable. Each of these amplifiers has a power nozzle indicated by a reference character a, a first outlet passage indicated by a reference character b, a second outlet passage indicated by the reference character c, a first control port indicated by a reference character d for causing a stream issuing from power nozzle a to emerge through outlet passage c and a second control port indicated by a reference character e for causing a stream issuing from power nozzle a to emerge through outlet port b. Amplifiers 140 and 141 also have additional control ports indicated by reference characters f and g. A signal in control port f to emerge through outlet passage c. A signal in control port g causes a stream issuing from power nozzle a to emerge through outlet passage b.

Reference hereinafter to a particular element of a fluid amplifier will be by fluid amplifier identification number and reference character of the particular element. For example, preferred outlet passage b of amplifier 120 will be indicated by "outlet 120b." The power nozzles of amplifiers 120 through 146 are each connected to a supply connection 116 on conduit 114 of pneumatic manifold 105. Accordingly, power nozzle a of each of amplifiers 120 through 146 is supplied with air at 1.5 p.s.i.g. which issues in a stream therefrom. For clarity, the interconnecting conduits are not shown in FIGURE 2.

Sensing circuit 101 comprises amplifiers 120 through 126. Amplifiers 120 and 121 are included in liquid level sensing circuits for tanks 61 and 62, amplifier 122 is included in a temperature sensing circuit, amplifier 123 is included in a pressure sensing circuit and amplifiers 124, 125 and 126 are included in circuits for sensing the state of valves 82, 69 and 70 respectively.

The liquid level sensing circuit, of which amplifier 120 is a part, also includes a conduit 150 connected at one end to control port 120d. The other end 151 of conduit 150 is open and is located within tank 61 at a predetermined level. A liquid level above end 151 is considered normal. Conduit 150 is supplied with air at 10 p.s.i.g. from conduit 111 of pneumatic manifold 105 through conduits 152 and 153 and an orifice 154. A pair of visual indicators 155 and 156 is associated with amplifier 120 and serves to indicate the liquid level within tank 61. Indicator 155 comprises cylindrical housing having a transparent end. A conspicuously colored piston is located within the housing and is slideable along the central axis thereof. When the piston is located proximate to the transparent end of the cylinder, it is easily visible. However, when the piston is located remote from the transparent end of the cylinder, it is not visible. Indicator 155 includes a pair of control ports which allow the introduction of a fluid pressure differential control signal across the piston. If the pressure introduced on the side of the piston adjacent to the transparent end of the cylinder is greater than the pressure introduced on the side of the piston remote from the transparent end of the cylinder, the piston will be moved away from the transparent end of the cylinder and will, therefore, be invisible. However, if the control signal produces a pressure differential of the opposite polarity across the piston, the piston will be moved toward the transparent end of the cylinder and will, therefore, be easily visible. This indicator is covered in U.S. Patent 3,357,638 issued to Sher et al. and assigned to the assignee of the present application. No further discussion of indicator 155 is necessary for the present invention. It should, however, be understood that indicators other than the one described will perform equally well in the applicants' system.

Indicator 156 is structurally similar to indicator 155 and need not be described in detail. However, the piston within indicator 156 is a different color than the piston within indicator 155. Indicators 155 and 156 are interconnected and connected to outlet passages 120b and 120c such that if a signal is present in passage 120b, the piston within indicator 155 is visible and the piston within indicator 156 is invisible. Conversely, if a signal is present in passage 120c, the piston within indicator 156 is visible and the piston within indicator 155 is invisible.

The liquid level sensing circuit for tank 62, of which amplifier 121 is a part, includes a conduit 160 which is connected at one end to control port 121d. The other end of conduit 160 is located within tank 62 in a manner similar to that described for conduit 150. Conduit 160 is supplied with air at 10 p.s.i.g. from conduit 153 through an orifice 161. A pair of visual indicators 162 and 163 is associated with amplifier 121. The connections between indicators 162 and 163 and amplifier 121 are the same as those described for indicators 155 and 156 and amplifier 120 and need not be further described.

The temperature sensor circuit, of which amplifier 122 is a part, includes a conduit 165 which connects control port 122d to inlet 94 of temperature sensor 93. Conduit 165 is supplied with air at 10 p.s.i.g. from conduit 153 through an orifice 166. A pair of indicators 167 and 168 is associated with amplifier 122. Indicator pair 167, 168 is similar to indicator pair 155, 156 and is connected to amplifier 122 in the same manner that indicator pair 155, 156 is connected to amplifier 120.

The pressure sensor circuit, of which amplifier 123 is a part, includes a conduit 170 which connects port 123d to inlet 91 of pressure sensor 90. Conduit 170 is supplied with air at 10 p.s.i.g. from conduit 153 through an orifice 171. A pair of indicators 172 and 173 is associated with amplifier 123. Indicator pair 172, 173 is similar to indicator pair 155, 156 and is connected to amplifier 123 in the same manner that indicator pair 155, 156 is connected to amplifier 120.

Amplifier 124, a conduit 175 and an orifice 176 comprise a sensor circuit for sensing the condition of the inlet to tanks 61 and 62. Control port 124d is connected to a conduit 177, which supplies control signals to valve 82 as will hereinafter be discussed, through a conduit 175 and an orifice 176. Two indicator pairs 180, 181 and 182, 183, each similar to indicator pair 155, 156, are associated with amplifier 124. Indicator pairs 180, 181 and 182, 183 are interconnected and connected to outlet passages 124b and 124c such that if a signal is present in passage 124b, only the pistons within indicators 181 and 183 are visible. If a signal is present in passage 124c, only the pistons within indicators 180 and 182 are visible.

Amplifier 125, a conduit 185 and an orifice 186 comprise a sensing circuit for sensing the state of valve 69. Control port 125d is connected to a conduit 187, which supplies control signals to valve 69, through conduit 185 and orifice 186. An indicator pair 190, 191 is associated with amplifier 125. Indicator pair 190, 191 is similar to indicator pair 155, 156 and is connected to amplifier 125 in the same manner that indicator pair 155, 156 is connected to amplifier 120.

Amplifier 126, a conduit 192, an orifice 193 and an indicator pair 195, 196 comprise a sensing circuit for sensing the state of valve 70. This sensing circuit is substantially identical with the previously described circuit for sensing the state of valve 69 and need not be further discussed.

Figure 3:
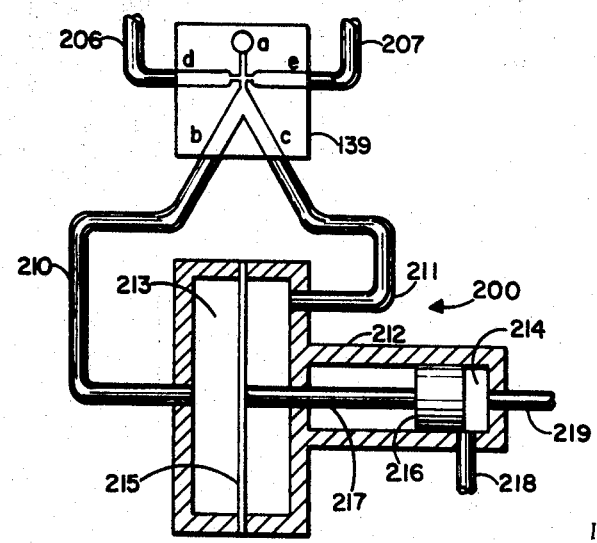
FIGURE 3 is a view of a fluid relay circuit suitable for use in the applicants' system, wherein the fluid relay is shown in cross section.

Timing circuit 102 comprises amplifiers 127, 128 and 139, a fluid relay 200 and a pressure tank 201. Control ports 127d and 127e are connected to outlet passages 120b and 121b by means of conduits 204 and 205. Outlet passages 127b and 127c are connected to control ports 139d and 139e by means of conduits 206 and 207. Amplifier 139 and fluid relay 200 comprise a fluid relay circuit which can be best understood by reference to FIGURE 3.

Fluid relay 200 comprises a housing 212 which defines a first generally cylindrical chamber 213 and a second generally cylindrical chamber 214. Chamber 213 is separated into two portions by means of a flexible diaphragm 215. A slideable piston 216 is enclosed within chamber 214 and is connected to the center of diaphragm 215 by means of a rod 217. Control ports 210 and 211 communicate with the portions of chamber 213 on either side of diaphragm 215. An inlet 218 and an outlet 219 communicate with chamber 214. Inlet 218 is located such that it is covered by piston 216 when piston 216 is in one of its extreme positions within chamber 214.

In operation, pressure differential control signals may be applied between control ports 210 and 211 from outlet passages 139b and 139c. If the pressure at control port 211 is greater than the pressure at control port 210, flexible diaphragm 215 will be deflected in a direction that removes piston 216 from inlet 218. Similiarly, if the pressure at control port 210 is greater than the pressure at control port 211, flexible diaphragm 215 will be deflected in the opposite direction, thus causing piston 216 to cover inlet 218. When piston 216 covers inlet 218, there is no fluid communication between inlet 218 and outlet 219. However, if piston 216 is removed from inlet 218, there is fluid communication between inlet 218 and outlet 219. Since the area of diaphragm 215 which is affected by pressure differential applied between control ports 210 and 211 is large, a relatively low pressure differential is necessary to deflect diaphragm 215. Accordingly, fluid relay 200 can be actuated by a relatively low pressure differential signal such as can be provided by fluidic circuitry.

Returning to FIGURE 2, inlet 218 of fluid relay 200 may be supplied with air at 20 p.s.i.g. from conduit 108 of pneumatic manifold 105 through conduits 220 and 224, a manually operated switch 222 which can be placed in one of two positions and conduit 223. In one of these positions, switch 222 provides fluid communication between conduits 223 and 221 thereby allowing for manual control of valves 69, 70 and 82. In the other position, switch 222 provides fluid communication between conduits 223 and 224 thereby allowing for automatic operation of control system 100 as will hereinafter be discussed. Outlet 219 of fluid relay 200 is connected to the inlet of pressure tank 201 by means of a conduit 225. The outlet of pressure tank 201 is connected to control port 128e by means of conduit 226 which contains an orifice 202. Outlet passage 127b is connected to control port 128d by means of a conduit 227.

Reference is now made to switching circuit 103 which includes amplifiers 129 through 133 and amplifiers 140 and 141. Control ports 130e and 129e are connected to outlet passages 120c and 121c by means of conduits 230 and 231, respectively. Control ports 129d and 130d are connected to outlet passages 140b and 140c by means of conduits 232 and 233. Control ports 140d and 140e are connected to outlet passages 130b and 129b by means of conduits 234 and 235. Control port 140g is connected to one leg of a first Y-junction 252 which will hereinafter be discussed. Amplifiers 129, 130 and 140 comprise a latching circuit 236 having an output which is dependent only on the last signal received at control ports 129e, 130e or 140g.

The output from latching circuit 236 is taken from outlet passage 140b and is transmitted to control port 131d by means of conduit 240. Outlet passages 131b and 131c are connected to control ports 132e and 133e by means of conduits 241 and 242. Control ports 132d and 133d are connected to outlet passage 128c by means of conduits 243 and 244. Outlet passages 132b and 133b are connected to control ports 141f and 141g by means of conduits 245 and 246. Control port 141d is connected to one leg of a second Y-junction 253 which will hereinafter be discussed.

Control circuit 104 comprises amplifiers 134 through 138, 142 through 146 and fluid relays 255 through 259. Amplifiers 134 and 142 and fluid relay 255 comprise a first control means for controlling valve 69. Control port 134d is connected to conduit 194 through conduit 192, orifice 193 and a conduit 260. Control port 134e is connected to outlet passage 141c through a conduit 261. Outlet passages 134b and 134c are connected to control ports 142d and 142e by means of conduits 262 and 263. Amplifier 142 and fluid relay 255 comprise a fluid relay circuit substantially identical to the one shown in FIGURE 3 and need not be further described.

Fluid relay 255 includes an inlet 265 which is connected to conduit 224 through a conduit 266 and fluid relay 259. Fluid relay 255 also contains an outlet 267 which is connected to a first inlet 268 of a first two-way ball valve 269 by means of conduit 270. Ball valve 269 also includes a second inlet 271 which may be supplied with air at 20 p.s.i.g. from conduit 221 through a conduit 272 and manually operated switch 273. Manually operated switch 273 is a two position valve which controls valve 69 either by providing fluid communication between conduits 221 and 272 or by blocking both conduits 221 and 272.

Valve 269 also includes an outlet 275 which is connected to control inlet 85 of valve 69 through conduit 187. Ball valve 269 operates such that if the pressure at inlet 268 is greater than the pressure at inlet 271, fluid communication is provided between inlet 268 and outlet 275 and inlet 271 is blocked. Conversely, if the pressure at inlet 271 is greater than the pressure at inlet 268, fluid communication is provided between inlet 271 and outlet 275 and inlet 268 is blocked.

Amplifiers 135 and 143 and fluid relay 256 comprise a second control means for controlling valve 70. Control port 135d is connected to conduit 187 through conduit 185, orifice 186 and a conduit 276. Control port 135e is connected to outlet passage 141b by means of conduit 277. Outlet passages 135b and 135c are connected to control ports 143d and 143e by means of conduits 278 and 279. Amplifier 143 and fluid relay 256 comprise a fluid relay circuit which is substantially identical to the one shown in FIGURE 3. Fluid relay 256 includes an inlet 280 which is connected to conduit 266 by means of a conduit 281. Fluid relay 256 also includes an outlet 282 which is connected to a first inlet 283 of a second ball valve 284 by means of a conduit 285. Ball valve 284 is substantially identical with ball valve 269 and includes a second inlet 289 which is connected to conduit 221 through a conduit 286, a manually operated switch 287 and a conduit 288. Switch 287 is substantially identical to switch 273 and controls valve 70. Ball valve 284 includes an outlet 290 which is connected to control inlet 86 of valve 70 by means of conduit 194.

Amplifier 144 and fluid relay 257 comprise a third control means for controlling valve 82. Amplifier 144 and fluid relay 257 also comprise a fluid relay circuit which is substantially identical to the one shown in FIGURE 3. Control ports 144d and 144e are connected to outlet passages 131b and 131c by means of conduits 292 and 293. Fluid relay 257 includes an inlet 294 which is connected to conduit 266 by means of a conduit 295. Fluid relay 257 also includes an outlet 296 which is connected to a first inlet 297 of a third ball valve 298 by means of a conduit 299. Ball valve 298 is substantially identical to ball valve 269 and includes a second inlet 300 which is connected to conduit 221 through a conduit 301, manually operated switch 302 and a conduit 303. Manually operated switch 302 is substantially identical to switch 273 and controls valve 82. Ball valve 298 includes an outlet 304 which is connected to control inlet 87 of valve 82 by means of conduit 177.

Amplifiers 136 and 145 and fluid relay 258 comprise a fourth control means for providing primary control of homogenizer 75. Control port 136d is connected to outlet passage 122b by means of conduit 310. Outlet passages 136b and 136c are connected to control ports 145d and 145e by means of conduits 311 and 312. Amplifier 145 and fluid relay 258 comprise a fluid relay circuit which is substantially identical to the one shown in FIGURE 3. Fluid relay 258 includes an inlet 313 which is connected to conduit 106. Conduit 106 is a supply conduit for air at 60 p.s.i.g. Fluid relay 258 also includes an outlet 314 which is connected to inlet 97 of control unit 96 for homogenizer 75 by means of a conduit 315.

Amplifiers 137, 138 and 146 and fluid relay 259 comprise a fifth control means for controlling valves 69, 70 and 82 if a low pressure is sensed by pressure sensor 90. Control port 137d is connected to conduit 114 of pneumatic manifold 105 through a conduit 320, a manually operated switch 321 and a conduit 322. Manually operated switch 321 is substantially identical to switch 273. When set to provide fluid communication between conduits 320 and 322, switch 321 serves to inhibit the effect of signals from pressure sensor 90. Control port 137e is connected to outlet passage 123c by means of conduit 323. Outlet passage 137b is connected to control port 138e by means of conduit 324. Control port 138e is connected to one leg of a third Y-junction 325 which will hereinafter be further discussed. Outlet passages 138b and 138c are connected to control ports 146d and 146e by means of conduits 326 and 327. Amplifier 146 and fluid relay 259 comprise a fluid relay circuit which is substantially identical to the one shown in FIGURE 3. Fluid relay 259 includes an inlet 330 which is connected to conduit 224 and an outlet 331 which is connected to conduit 266.

Y-junctions 252, 253 and 325 comprise a reset circuit. A second leg of each of Y-junctions 252, 253 and 325 is connected to conduit 111 of pneumatic manifold 105 by means of conduits 330, 331 and 332, a manually operated switch 333 and conduit 152. Manually operated switch 333 is substantially identical to switch 273. Switch 333 serves to reset the control system when positioned to provide fluid communication between conduits 152 and 332. The third leg of each of Y-junctions 252, 253 and 325 is vented to the atmosphere through an orifice. Orifices 335, 336 and 337 are associated with Y-junctions 252, 253 and 325, respectively. The purpose of orifices 335, 336 and 337 is to allow the natural entrainment demands of amplifiers 138, 140 and 141 to be met when switch 333 is positioned to block conduit 332, thus insuring proper operation of the amplifiers.

The operation of the applicants' control system will now be discussed. It will be assumed that pump 66 is initially shut down. It will also be assumed that homogenizer 75 is initially shut down by means of control unit 96. Prior to setting the system into automatic operation, processing equipment 60 must be charged with chemicals and the conditions necessary for automatic operation must be established. This is accomplished by manually positioning switch 222 such that it provides fluid communication between conduits 221 and 223. As previously mentioned, this places the control system in a manual operating mode. Switches 273 and 302 are set to block conduits 221, 272, 301 and 303. Switch 287 is set to provide fluid communication between conduits 286 and 288. Accordingly, air at 20 p.s.i.g. is supplied to inlet 86 of valve 70 from conduit 108 of pneumatic manifold 105 through conduit 223, switch 222, conduits 221 and 288, switch 287, conduit 286, ball valve 284 and conduit 194. Valve 70, which is normally open, is thus closed by the signal supplied to control inlet 86. The signal present in conduit 194 is also transmitted to control port 126d through conduit 192 and orifice 193. The pressure thus present at control port 126d is sufficient to cause an output from outlet passage 126c. Accordingly, the piston within indicator 196 is visible and the piston within indicator 195 is not visible, thus indicating that valve 70 is closed.

No signals are supplied to valves 69 and 82 since switches 273 and 302 are closed. Accordingly, valves 69 and 82, which are normally open, remain open. Since there are no signals in conduits 177 and 187, no signals are transmitted to control ports 124d and 125d. Accordingly, the output signals from amplifiers 124 and 125 are from outlet passages 124b and 125b. The output signal from amplifier 124 causes the pistons within indicators 181 and 183 to be visible and the pistons within indicators 180 and 182 to be invisible. Thus, valve 82 is indicated to be open and a simulated valve in inlet 78 is indicated to be closed. Also, the piston within indicator 190 is visible and the piston within indicator 191 is invisible, thus indication that valve 69 is open. Switch 333 is set in the reset position wherein it provides fluid communication between conduits 152 and 332. Accordingly, air at 10 p.s.i.g. is supplied to control ports 140g, 141d and 138d. Switch 321 is set to block conduits 320 and 322, thereby supplying no signal to control port 137d. This is the normal operating position for switch 321.

With the controls set as described, processing equipment 60 is charged with chemicals by external means. This is accomplished by filling tank 61 with the proper chemicals in the prescribed proportions. After filling tank 61, end 151 of conduit 150 is submerged. Conduit 150 is supplied with air at 10 p.s.i.g. from conduit 111 of pneumatic manifold 105 through conduits 152 and 153 and orifice 154. Orifice 154 functions to provide a substantially constant flow of air into conduit 150. With end 151 of conduit 150 submerged, the pressure supplied to control port 120d by conduit 150 is sufficient to cause an output from outlet passage 120c. Accordingly, the piston within indicator 156 is visible, thus indicating a normal liquid level in tank 61.

Tank 62 is empty, thus the open end of conduit 160 is not submerged. Conduit 160 is supplied with air at 10 p.s.i. from conduit 111 of pneumatic manifold 105 through conduits 152 and 153 and orifice 161 functions to provide a substantially constant flow of air into conduit 160. When the open end of conduit 160 is not submerged, the pressure supplied to control port 121d is not sufficient to cause an output from outlet passage 121c. Accordingly, there is an output from outlet passage 121b which causes the spool within indicator 162 to be visible, thus indicating a low liquid level in tank 62. The signal from outlet passage 121b is transmitted to control port 127e and is sufficient to prevent an output from outlet passage 127b. Accordingly, no signal is supplied to control port 128d. It should also be noted that due to the position of switch 222, conduit 220 is not pressurized. Therefore, regardless of the state of fluid relay 200, no air is supplied to pressure tank 201 and consequently no signal is supplied to control port 128e. Thus, no output is provided from outlet passage 128c.

The signal from outlet passage 120c is supplied to control port 130e and is sufficient to prevent an output from outlet passage 130b. Control port 140g is receiving a signal from the reset circuit which causes an output from outlet from outlet passage 140b. This signal is supplied to control port 129d and is sufficient to prevent an output from outlet passage 129b. Since no signals are present in outlet passages 129b and 130b, no signals are supplied to control ports 140d or 140e.

The signal from outlet passage 140b is also supplied to control port 131d where it causes an output from outlet passage 131c and prevents an output from outlet passage 131b. The signal from outlet passage 131c is supplied to control port 133e and is sufficient to prevent an output from outlet passage 133b. Since there is no signal in outlet passage 131b, no signal is supplied to control port 132e. As previously noted, there is no signal in outlet passage 128c. Consequently, no signal is transmitted to control port 132d. Thus, an output is provided from outlet passage 132b and is supplied to control port 141f. A signal is also present at control port 141d from the reset circuit. The signals at both control ports 141d and 141f cause the output from amplifier 141 to be from outlet passage 141c.

The signal from outlet passage 141c is supplied to control port 134e. It should also be noted that control port 134d is receiving a signal from conduit 194 through conduit 192, orifice 193 and conduit 260. A signal at either control port 134d or control port 134e is sufficient to cause the output from amplifier 134 to be from outlet passage 134c. Accordingly, a signal is supplied to control port 142e which causes fluid relay 255 to remain closed.

Since no signal is present in outlet passage 141b, no signal is supplied to control port 135e. Further, since there is no pressure in conduit 187, no signal is supplied to control 135d through conduit 276, orifice 186 and conduit 185. Thus, the output from amplifier 135 is from outlet passage 135b. This signal is supplied to control port 143d and causes fluid relay 256 to remain open.

Reference is now made to the pressure sensor circuit which includes pressure sensor 90, conduit 170 and amplifier 123. Conduit 170 is supplied with air at 10 p.s.i.g. from conduit 153 through orifice 171. Since pump 66 is not in operation, a low pressure is sensed by pressure sensor 90. Accordingly, there is fluid communication between inlet 91 and outlet 92. The air in conduit 170 thus escapes through pressure sensor 90. A low pressure signal supplied to control port 123d from conduit 170 and causes the output from amplifier 123 to be from outlet passage 123b. This signal causes the piston within indicator 172 to be visible, thus indicating a low pump discharge pressure. Since no signal is present in outlet passage 123c, no signal is transmitted to control port 137e. In addition, due to the position of switch 321, no signal is present at control port 137d. Consequently, an output is provided from outlet passage 137b and is transmitted to control port 138e. As previously noted, a signal from the reset circuit is also present at control port 138d. A signal at either control port 138d or control port 138e is sufficient to cause an output from outlet passage 138c. This signal is transmitted to control port 146e and causes fluid relay 259 to remain closed.

The temperature at temperature sensor 93 is assumed not to be excessive. Accordingly, there is no fluid communication between inlet 94 and outlet 95. Air at 10 p.s.i.g. is supplied to conduit 165 from conduit 153 through orifice 166. Since the fluid cannot escape through temperature sensor 93, the pressure signal transmitted to control port 122d is sufficient to prevent any output from outlet passage 122b and to cause an output from outlet passage 122c. Consequently, the piston within indicator 168 is visible, thus indicating a normal temperature. Since no output signal is present at outlet passage 122b, no signal is transmitted to control port 136d. Accordingly, the output from amplifier 136 is from outlet passage 136b. The output signal from amplifier 136 is transmitted to amplifier 145 and causes fluid relay 258 to remain open. Since fluid relay 258 is open, air at 60 p.s.i.g. is supplied therethrough to control 96 of homogenizer 75. Accordingly, the primary condition necessary for operation of homogenizer 75 is met, however homogenizer 75 remains shut down by means of control unit 96.

Pump 66 is now set into operation, thus increasing the pressure at pressure sensor 90. When the pump discharge pressure becomes normal, the valve within pressure sensor 90 closes, thus preventing the escape of air through pressure sensor 90. The pressure transmitted to control port 123d from conduit 170 accordingly increases and switches the output of amplifier 123b to outlet passage 123c. The piston within indicator 172 disappears and the piston within indicator 173 becomes visible, thus indicating a normal pump discharge pressure. The output signal from outlet passage 123c is transmitted to control port 137e where it switches the output of amplifier 137 from outlet passage 137b to outlet passage 137c. This removes the signal from control port 138e. However, since a signal is still present at control port 138d, the output of amplifier 138 remains from outlet passage 138c.

The conditions are now met to allow the removal of the reset signal. This is accomplished by manually setting switch 333 in the position in which it blocks conduits 152 and 332. The reset signal is thus removed from control ports 140g, 141 and 138. Amplifier 140 is bistable. Accordingly, in the absence of the contrary control signal, the output of amplifier 140 will not change. No signals are present at control port 140d or 140e. Accordingly, the output from amplifier 140 remains from outlet passage 140b. Therefore, amplifier 132 continues to have an output from outlet passage 132b and amplifier 133 continues to have an output from outlet passage 133c. Accordingly, removal of the reset signal from control port 141d does not change the output of amplifier 141 since the signal supplied to control ports 141f and 141g have not changed.

Since no signal was present in control port 138e, the removal of the signal from control port 138d causes the output of amplifier 138 to be switched from outlet passage 138c to outlet passage 138b. This signal is supplied to amplifier 146 and causes fluid relay 259 to open. However, since no air is presently being supplied to inlet 330 of fluid relay 259, there is no change at outlet 331.

The conditions are now met for setting the control system into automatic operation. This is accomplished by manually setting switch 222 such that fluid communication is provided between conduits 223 and 224. Thus, the air supplied by conduit 223 is switched from conduit 221 to conduit 224. Accordingly, air is supplied to inlets 265, 280, 294 and 218 of fluid relays 255, 256, 257 and 200. It should be noted that fluid relays 255 and 257 are closed and fluid relay 256 is open, corresponding to the states of switches 273, 302 and 287, respectively. Since fluid relays 255 and 257 are closed, air is not supplied to inlets 268 and 297 of valves 269 and 298. Since fluid relay 256 is open, air is supplied to inlet 283 of ball valve 284. Thus, the effect of switching to automatic operation is to supply conduit 194 with air from conduit 285 rather than from conduit 286. Accordingly, valve 70 remains closed and valves 69 and 82 remain open.

As previously discussed, since valve 82 is open the liquid pumped through pipe 80 will enter tank 62 through inlet 79. Thus, after a period of operation of pump 66, sufficient liquid is pumped into tank 62 to submerge the open end of conduit 160. At this time the pressure in conduit 160 increases and an increased pressure signal is supplied to control port 121d. This signal switches the output of amplifier 121 from outlet passage 121b to outlet passage 121c. Accordingly, the piston within indicator 162 disappears and the piston within indicator 163 becomes visible, indicating a normal liquid level in tank 62. Since the signal is removed from outlet passage 121b, the signal is also removed from control port 127e. Since no signal is present in either control port 127d or control port 127e, the output from amplifier 127 switches from outlet passage 127c to outlet passage 127b. The output signal from amplifier 127 is supplied to amplifier 139 and causes fluid relay 200 to open. Inlet 218 of fluid relay 200 is supplied with air at 20 p.s.i.g. when switch 222 is in the automatic operating mode position. Accordingly, pressure tank 201 is pressurized and control 128e is provided with a signal from pressure tank 201 through orifice 202 and conduit 226. It should also be noted that control 128d is supplied with a signal from outlet passage 127b through conduit 227. The signals at control ports 128d and 128e cause an output from outlet passage 128c.

The output signal from outlet passage 121c is supplied to control port 129e. However, since a signal was already present at control 129d, the output from amplifier 129 does not change. Consequently, the outputs from amplifiers 140 and 131 and the signals supplied to control ports 132e and 133e do not change. The output from control port 128c is transmitted to control ports 132d and 133d. The signal at control port 132d causes the output from amplifier 132 to switch from outlet passage 132b to outlet passage 132c. The output signal from amplifier 133 does not change since there was already a signal present at control port 133e. Since the outputs from amplifiers 132 and 133 are now from outlet passages 132c and 133c, respectively, no control signals are supplied to amplifier 141. However, since amplifier 141 is bistable, its output does not change.

Since the outputs of amplifiers 131 and 141 did not change, the signal paths through control circuit 104 also remain the same and the states of valves 69, 70 and 82 are not changed. However, since pump 66 continues to transfer liquid from tank 61 to tank 62, the liquid level in tank 61 eventually falls below end 151 of conduit 150.

Accordingly, the pressure transmitted to control port 120d by conduit 150 decreases and the output from amplifier 120 switches to outlet passage 120b. Indicators 155 and 156 thus indicate a low liquid level in tank 61. In addition, a signal is supplied to control port 127d. The output of amplifier 127 is thus switched from outlet passage 127b to outlet passage 127c. The output signal from amplifier 127 is also supplied to amplifier 139 and causes fluid relay 200 to close. Accordingly, air is no longer supplied to pressure tank 201. However, due to the capacity of tank 201 and the fact that the escape of air from tank 201 is restricted by orifice 202, a signal continues to be supplied to control port 128e. In addition, since the output signal from amplifier 127 was switched to outlet passage 127c, the signal was removed from control port 128d. However, since a signal is present at control 128e, the output from amplifier 128 continues to be from outlet passage 128c.

Since the signal is removed from outlet passage 120c, the signal is also removed from control port 130e. Consequently, there is no signal at either control port 130d or control port 130e and the output from amplifier 130 switches from outlet passage 130c to outlet passage 130b. The signal from outlet passage 130b is supplied to control port 140d and causes the output from amplifier 140 to switch from outlet passage 140b to outlet passage 140c which again provides the signal at control port 130d and switches the output from amplifier 130 back to outlet passage 130c. Amplifiers 129 and 130 comprise a latching circuit which prevents spurious switching of amplifier 140 when the liquid level in either tank 61 or tank 62 raises above the open end of conduit 150 or conduit 160.

Since the output from amplifier 140 remains in outlet passage 140c, the signal is removed from control port 131d. The output from amplifier 131 is switched from outlet passage 131c to outlet passage 131b. This signal is transmitted to amplifier 144 and causes fluid relay 257 to open. Accordingly, air at 20 p.s.i.g. is supplied to valve 82 from conduit 266 through conduit 295, fluid relay 257, conduit 299, ball valve 298 and conduit 177. This signal causes valve 82, which is normally open, to close.

The output signal from outlet passage 131b is also supplied to control port 132e. However, a signal is already present at control port 132d. Thus, the output from amplifier 132 remains from outlet passage 132c. Since no signal is present in outlet passage 131c, no signal is transmitted to control port 133e. However, since there is a signal present at control port 133d, the output from amplifier 133 remains from outlet passage 133c. The control signals from amplifiers 132 and 133 to amplifier 141 do not change, therefore the output of amplifier 141 does not change. Thus, valves 69 and 70 are not caused to change states. Since valve 69 is open and valves 70 and 82 are now closed, pump 66 functions to recirculate the liquid remaining in tank 61 through homogenizer 75 and back into tank 61 through inlet 78.

Reference is now made to pressure tank 201 which is presently not being supplied with air since fluid relay 200 is closed, but is supplying a signal to control port 128e through orifice 202 and conduit 226. Eventually, the air supply in pressure tank 201 is depleted and the signal is removed from control port 128e. Since no signals are then present at either control 128d or control port 128e, the output from amplifier 128 switches from outlet passage 128c to outlet passage 128b. This removes the signals from control ports 132d and 133d. Since a signal is present at control port 132e, the output from amplifier 132 remains from outlet passage 132c. However, no signals are now supplied to either control port 133d or control port 133e. Consequently, the output from amplifier 133 switches from outlet passage 133c to outlet passage 133b. Accordingly, a signal is supplied to control port 141g, thus switching the output of amplifier 141 from outlet passage 141c to outlet passage 141b. The signal is thus removed from control port 134e. However, there is still a signal present at control port 134d from conduit 194 through conduit 192, orifice 193 and conduit 260. The signal from outlet passage 141b is transmitted to control port 135e where it switches the output from amplifier 135 to outlet passage 135c. This signal is transmitted to amplifier 143 and closes fluid relay 256. Accordingly, the pressure signal is removed from conduit 285, ball valve 284 and conduit 194. The removal of the pressure signal from conduit 194 causes valve 70, which opens in the absence of the control signal, to open. In addition, since the pressure signal is removed from conduit 194, the signal transmitted to control port 134d through conduit 192, orifice 193 and conduit 260 is also removed. This causes the output from amplifier 134 to switch from outlet passage 134c to outlet passage 134b. The output signal from amplifier 134 is supplied to amplifier 142 and opens fluid relay 255. Air at 20 p.s.i. is thus supplied to control inlet 85 of valve 69 through fluid relay 255, conduit 270, ball valve 269 and conduit 187. This signal causes valve 69 to close. Accordingly, pump 66 now transfers liquid from tank 62 into tank 61.

From the foregoing discussion it can be seen that pressure tank 201 and orifice 202 comprise a timing device which establishes a time period during which the small amount of liquid remaining in tank 61 is recirculated through homogenizer 75. As will hereinafter be discussed, pressure tank 201 and orifice 202 perform the same function when a low liquid level is reached in tank 62.

Conduit 185, orifice 186 and conduit 276 and conduit 192, orifice 193 and conduit 260 comprise an interlocking circuit for preventing valves 69 and 70 from being closed at the same time. The purpose for preventing the closure values 69 and 70 at the same time is to prevent "starving" of pump 66 which results in an insufficient flow of liquid into homogenizer 75 and subsequent damage to the homogenizer.

As end 151 of conduit 150 becomes submerged in the liquid being transferred into tank 61, the pressure in conduit 150 increases and the output of amplifier 120 switches to outlet passage 120c. The pressure signal at outlet passage 120b and control port 127d is thus removed. Accordingly, the output of amplifier 127 switches to outlet passage 127b. The output signal from amplifier 127 is supplied to amplifier 139 and causes fluid relay 200 to open, thus repressurizing pressure tank 201. Signals are supplied from both outlet passage 127b and pressure tank 201 to control ports 128d and 128e. The output signal from outlet passage 128c is supplied to control ports 132d and 133d where it causes the output of amplifier 133 to be switched to outlet passage 133c. Accordingly, no signals are supplied to control ports 141f and 141g. However, since amplifier 141 is bistable, its output does not change in the absence of a contrary control signal. The output signal from outlet passage 120c is transmitted to control port 130e. It, however, has no effect on the output signal of amplifier 130 since the signal is already present at control port 130d.

Since pump 66 continues to transfer liquid from tank 62 into tank 61, the liquid level in tank 62 eventually falls below the open end of conduit 160. The pressure signal supplied to control port 121d by conduit 160 thus decreases, causing the output from amplifier 121 to be switched from outlet passage 121c to outlet passage 121b. The output signal from amplifier 121 is transmitted to control port 127e where it causes the output of amplifier 127 to be switched to outlet passage 127c. The signal from amplifier 127 are supplied to amplifier 139 and cause fluid relay 200 to close, thus cutting off the air supply to pressure tank 201. Since the output from amplifier 127 is switched away from outlet passage 127b, no signal is supplied to control 128d. However, due to the storage capacity of pressure tank 201, a signal continues to be supplied to control port 128e. Thus, the output of amplifier 128 remains from outlet passage 128c and amplifiers 132, 133 and 141 are not caused to switch. Since the output of amplifier 141 does not change, the states of valves 69 and 70 do not change.

Since the signal has been removed from outlet passage 121c, no signal is supplied to control port 129e. Thus, no signal is supplied to either control port 129d or control port 129e. This results in the output of amplifier 129 being switched from outlet passage 128c to outlet passage 129b. The output signal from outlet passage 129b is supplied to control port 140e where it switches the output of amplifier 140 from outlet passage 140c to outlet passage 140b. The output signal from outlet passage 140b switches the output of amplifier 129 back to outlet passage 120c and also switches the output of amplifier 131 from outlet passage 131b to outlet passage 131c. The output signal from amplifier 131 is supplied to amplifier 144 and causes fluid relay 257 to close. The closing of fluid relay 257 removes the pressure signal from control inlet 87 of valve 82, thus allowing valve 82 to open.

The output signal from outlet passage 131c is supplied to control port 133e. Signals are thus present at both control ports 133d and 133e. Accordingly, the output of amplifier 133 is from outlet passage 133c. Since there is no output signal in outlet passage 131b, no signal is supplied to control port 132e. However, a signal is present at control port 132d, thus causing the output of amplifier 132 to be from outlet passage 132c.

Accordingly, the valve 69 is presently closed and valves 70 and 82 are presently open, thus allowing pump 66 to circulate the liquid remaining in tank 62 through homogenizer 75 and back into tank 62 through inlet 79. This process continues until the air supply in pressure tank 201 is depleted, at which time the signal at control port 128e is removed. Accordingly, no signal is present at either control port 128d or control port 128e and the output of amplifier 128 is switched away from outlet passage 128c. This removes the signals from control ports 132d and 133d. Due to the presence of a signal at control port 133e, the output of amplifier 133 remains from outlet passage 133c. However, since the signal at control port 132e is the only control signal supplied to amplifier 132, its removal switches the output of amplifier 132 to outlet passage 132b. This signal is supplied to control port 141f and causes the output of amplifier 141 to be switched away from outlet passage 141b and into outlet passage 141c.

As previously discussed in connection with valve 69, the removal of a signal from outlet passage 141b and control port 135e alone is not sufficient to switch the output of amplifier 135 to outlet passage 135b, thus opening fluid relay 256 and closing valve 70. It is also necessary that valve 69 be open. However, the presence of an output signal in outlet passage 141c is sufficient to provide the necessary signal to open valve 69, thus allowing valve 70 to close as follows. The signal from outlet passage 141 is supplied to control port 134e where it switches the output from amplifier 134 to outlet passage 134c. The output signal from amplifier 134 is transmitted to amplifier 142 and causes fluid relay 255 to close. Consequently, no pressure signal is supplied to inlet 85 of valve 69 through conduit 270, ball valve 269 and conduit 187. No signal is supplied to control port 135d through conduit 185, orifice 186 and conduit 276. Thus, no control signals are supplied to amplifier 135. The output of amplifier 135 is from outlet passage 135b which causes fluid relay 256 to open, thus supplying the necessary pressure signal to close valve 70.

The system is now set is begin transferring liquid from tank 61 into tank 62. This operation corresponds to the first automatic operation discussed. The previously discussed sequence of operations is continuously repeated as described until manually terminated. Accordingly, the pimary cyclic control process need not be further described. However, the applicants' control system performs two other control functions. The first of these control functions is to shut down homogenizer 75 in case the temperature at homogenizer outlet 77 becomes excessively high. This function is accomplished as follows. For normal operating temperatures, temperature sensor 93 does not provide fluid communication between inlet 94 and outlet 95. However, if the temperature does become excessive, fluid communication is provided between inlet 94 and outlet 95. This condition results in air from conduit 165 escaping through temperature sensor 93. Accordingly, the pressure transmitted to control port 122d by conduit 165 is reduced thus switching the output of amplifier 122 to the outlet passage 122b. The output signal from amplifier 122 is transmitted to indicators 167 and 168 which then indicate a high homogenizer discharge temperature. The signal in outlet passage 122b is also transmitted to control port 136d and causes the output of amplifier 136 to be switched to outlet passage 136c. The output signal from amplifier 136 is transmitted to amplifier 145 and causes fluid relay 258 to close. The closure of fluid relay 258 cuts off the air supply to control unit 96 of homogenizer 75, thus shutting down the operation of homogenizer 75.

The second of these control functions is to open valves 69, 70 and 82 if the pump discharge pressure becomes excessively low. The reason for this feature is to protect the homogenizer which may be damaged if an insufficient flow of liquid is supplied thereto. This function is accomplished as follows. If the pump discharge pressure is normal, pressure sensor 90 does not provide fluid communication between inlet 91 and outlet 92. However, if the pump discharge pressure is abnormally low, pressure sensor 90 does provide fluid communication between inlet 91 and outlet 92. In this event, fluid from conduit 170 escapes through pressure sensor 90, thus lowering the pressure at control port 123d. The output of amplifier 123 is thus switched from outlet passage 123c to outlet passage 123b. The output signal from amplifier 123 is transmitted to indicators 172 and 173 which then indicate a low pump discharge pressure. Since no output is present in outlet passage 123c, no signal is transmitted to control port 137e. In addition, no signal is transmitted to control port 137d due to the position of switch 321. Accordingly, the output from amplifier 137 is from outlet passage 137b. This signal is transmitted to control port 138e and switches the output of amplifier 138 from outlet passage 138b to outlet passage 138c. The output signal from amplifier 138 is transmitted to amplifier 146 and causes fluid relay 259 to close. With fluid relay 259 closed, no pressure is supplied to inlets 255, 280 and 294 of fluid relays 255, 256 and 257. Accordingly, no pressure signal can be supplied from fluid relays 255, 256 and 257 to valves 69, 70 and 82. Since valves 69, 70 and 82 open in the absence of a control signal, the closure of fluid relay 259 operates to open valves 69, 70 and 82. This results in a maximum liquid supply to pump 66 and a minimum impedance to liquid flow from pump 66. Accordingly, the flow of liquid to homogenizer 75 is maximized.

It should be noted that the effect of a low pressure signal from pressure sensor 90 can be inhibited by setting switch 321 such that fluid communication between conduits 320 and 322 is provided. In this event, a fluid signal is provided at control port 137d. Therefore, regardless of whether or not there is a signal at control port 137e, the output from amplifier 137 is from outlet passage 137c. From the previous discussion it will be noted that this is a necessary condition for the fluid relay 259 to remain open. The provision of low pressure inhibit switch 321 allows for operation of homogenizer 75 under abnormal conditions while under the supervision of a human operator.

What is claimed is:
1. A control system comprising:
 a fluidic sensing circuit operable to produce a plurality of fluid signals;
 fluidic timing means having an input and an output, said timing means being operable to produce an output signal in response to an input signal, the output signal being delayed in time from the input signal;
 first means connecting said sensing means to the input of said timing means so as to convey at least one of said plurality of signals thereto;
 fluidic switching means having input means and output means, said switching means being operable to produce an output signal in response to an input signal;
 means connecting the output of said timing means to the input means of said switching means;
 second means connecting said sensing circuit to the input means of said switching means so as to convey at least one of said plurality of signals thereto;
 a fluidic control circuit operable to provide a plurality of output functions in response to signals supplied thereto;
 means connecting the output means of said switching means to said control circuit; and
 third means connecting said sensing circuit to said control circuit so as to convey at least one of said plurality of signals thereto.

2. The control system of claim 1 wherein said sensing circuit, said timing means, said switching means, and said control circuit include fluid amplifiers.

3. The control system of claim 2 wherein said first means, said second means and said third means are operable to convey the same signal from said sensing circuit to said timing means, said switching means and said control circuit.

4. The control system of claim 3 wherein the output means of said switching means includes a plurality of signal outputs, said switching means being operable to transfer a signal from said timing means to at least one of the plurality of signal outputs in response to signals from said sensing circuit.

5. The control system of claim 4 wherein:
 said sensing circuit includes first and second sensing means operable to produce first and second fluid signals;
 the input means of said switching means includes a signal input, a first switching signal receiver and a second switching signal receiver;
 the output means of said switching means includes a first signal output and a second signal output, said switching means being operable to transfer a signal from the signal input to the first signal output in response to a signal at the first switching signal receiver, said switching means being operable to transfer a signal from the signal input to the second signal output in response to the signal at the second switching signal receiver;
 said means connecting said sensing circuit to the input means of said switching means is operable to convey the first and second fluid signals from said sensing circuit to the first and second switching signal receivers of said switching means respectively.

6. A control system for automatically controlling a plurality of steps of a continuous cyclic process comprising:
 first fluidic sensing means operable to produce a first fluid signal indicative of a first process parameter;
 second fluidic sensing means operable to produce a second fluid signal indicative of a second process parameter;
 fluidic timing means having an input and an output, said timing means being operable to produce an output signal in response to an input signal, the output signal being delayed in time from the input signal;
 fluidic switching means having an input, a first switching signal receiver, a second switching signal receiver and a plurality of signal outputs;
 first connecting means connecting the output of said timing means to the input of said switching means;
 second connecting means connecting said first sensing means to the input of said timing means and the first switching signal receiver of said switching means;

third connecting means connecting said second sensing means to the input of said timing means and the second switching signal receiver of said switching means;

a fluidic control circuit; and fourth connecting means connecting said first sensing means, said second sensing means and the plurality of signal outputs of said switching circuit to said control circuit, said control circuit being operable to control the plurality of steps of the continuous cyclic process.

7. The control system of claim 6 wherein:

said control circuit includes first, second and third control means, each of the first, second and third control means being operable to provide first and second output functions; and said fourth connecting means includes means connecting at least one of the plurality of signal outputs of said switching means to the first control means, at least one of the plurality of signal outputs of said switching means to said second control means and said first and said second sensing means to the third control means.

8. The control system of claim 7 further including means interlocking the first and second control means of said control circuit so as to prevent the first and second control means from providing first output functions simultaneously.

9. The control system of claim 8 further including:

third sensing means operable to produce a third fluid signal indicative of a third parameter of the continuous cyclic process;

fourth control means operable to provide first and second output functions;

means connecting said third sensing means to said fourth control means;

means connecting said fourth control means to the first, second and third control means of said control circuit such that the first output function provided by fourth control means causes each of said first, second and third control means to provide its first output function;

manual disabling means; and means connecting said manual disabling means to said fourth control means, said manual disabling means being operable to nullify the effect of the third fluid signal produced by said third sensing means.

10. The control system of claim 9 further including:

fourth sensing means operable to produce a fourth fluid signal indicative of a fourth parameter of the continuous cyclic process;

fifth control means operable to control the fourth parameter; and means connecting said fourth sensing means to said fifth control means.

References Cited

UNITED STATES PATENTS

| | | |
|---|---|---|
| 3,228,602 | 1/1966 | Boothe. |
| 3,292,648 | 12/1966 | Colston _____ 137—815 XR |
| 3,302,398 | 2/1967 | Taplin et al. ____ 137—815 XR |
| 3,348,559 | 10/1967 | Brothman et al. __ 137—26 XR |
| 3,379,204 | 4/1968 | Kelley et al. _____ 137—815 |
| 3,403,509 | 10/1968 | Eastman et al. __ 137—815 XR |
| 3,407,828 | 10/1968 | Jones _____ 137—815 |
| 3,426,782 | 2/1969 | Thorburn _____ 137—815 |

SAMUEL SCOTT, Primary Examiner

U.S. Cl. X.R.

235—201